E. DE H. CALDWELL.
BRAKE MECHANISM FOR MOTOR VEHICLES.
APPLICATION FILED FEB. 5, 1915.
1,200,808.
Patented Oct. 10, 1916.
2 SHEETS—SHEET 1.
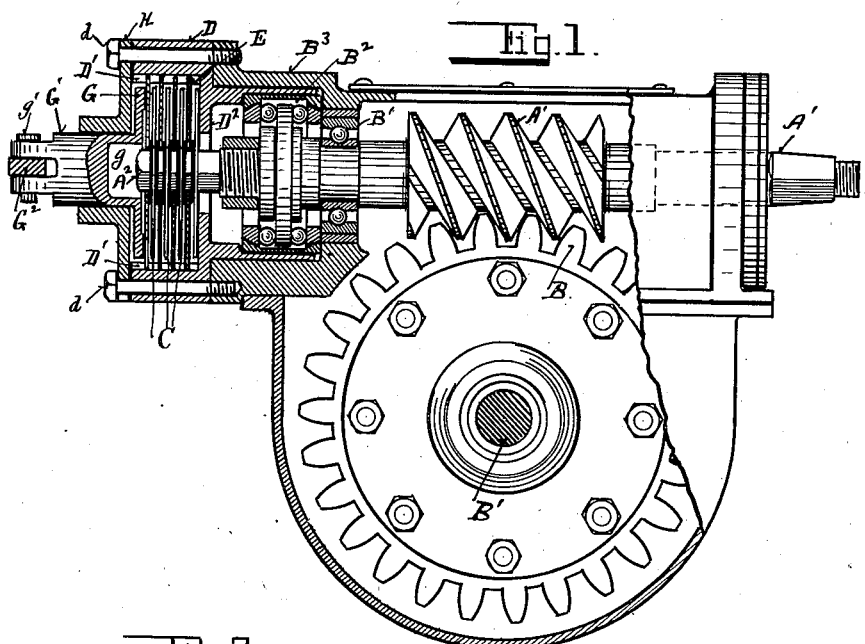
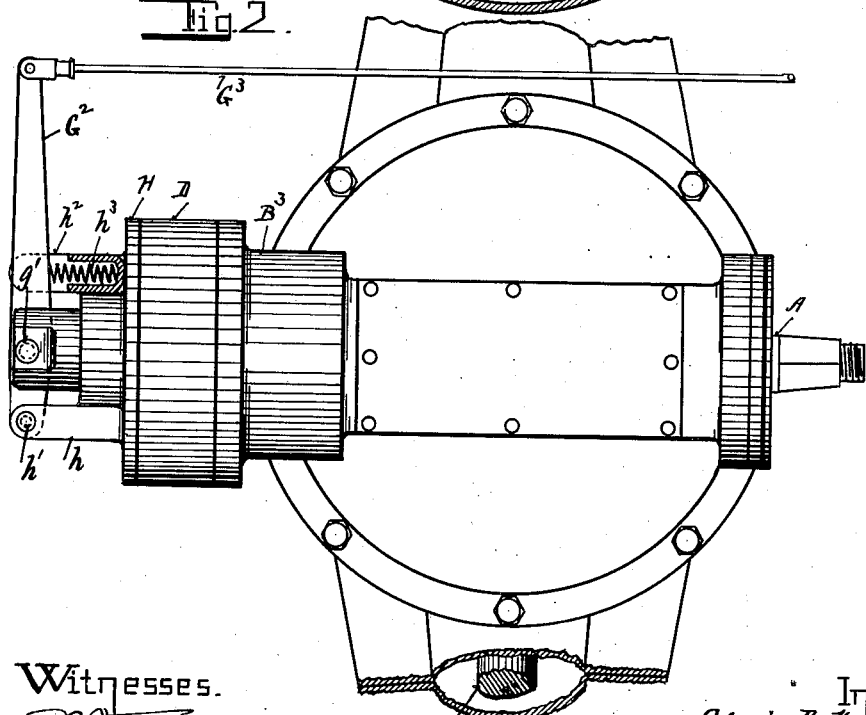

E. DE H. CALDWELL.
BRAKE MECHANISM FOR MOTOR VEHICLES.
APPLICATION FILED FEB. 5, 1915.
1,200,808.
Patented Oct. 10, 1916.
2 SHEETS—SHEET 2.
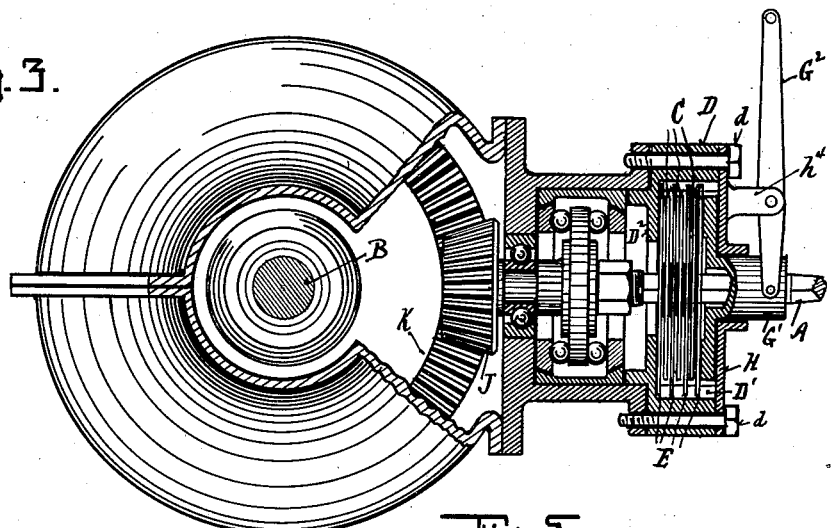
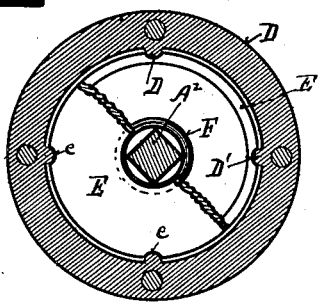
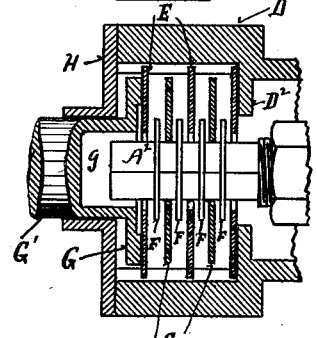
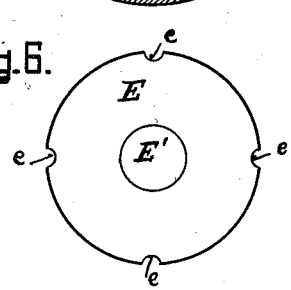
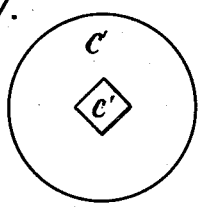

UNITED STATES PATENT OFFICE.

EDWIN DE H. CALDWELL, OF DUNKIRK, NEW YORK, ASSIGNOR TO EMPIRE AXLE COMPANY, OF DUNKIRK, NEW YORK, A CORPORATION OF NEW YORK.

BRAKE MECHANISM FOR MOTOR-VEHICLES.

1,200,808. Specification of Letters Patent. Patented Oct. 10, 1916.

Application filed February 5, 1915. Serial No. 6,308.

*To all whom it may concern:*

Be it known that I, EDWIN DE H. CALDWELL, a citizen of the United States, residing at Dunkirk, in the county of Chautauqua and State of New York, have invented certain new and useful Improvements in Brake Mechanism for Motor-Vehicles; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to brake mechanism for motor vehicles, and has for its object the providing the drive-shaft of such a vehicle with brake mechanism so that after the motor power is disconnected from the drive-shaft, the revolutions of the drive-shaft may be retarded and stopped by applying the brake direct to the drive-shaft, thereby taking advantage of the braking action consequent upon driving the drive-shaft from the differential gear. In thus applying the brake mechanism, a much less amount of power applied thereon will control the speed of the vehicle, than when the brake mechanism is applied directly upon the usual brake-drums on the vehicle wheels.

The features of my invention are hereinafter fully explained and pointed out, and are illustrated in the accompanying drawings in which:—

Figure 1, is a view partially in elevation and partially in section, of a portion of a vehicle axle and differential gear, embodying my invention. Fig. 2, is a top view thereof. Fig. 3, is a view partially in elevation and partially in section, of a modification of my invention. Fig. 4, is a transverse section of the brake mechanism shown in Figs. 1 and 3. Fig. 5 is a longitudinal section of the same, somewhat exaggerated for the purpose of illustration. Fig. 6, is a plan view of one of the stator-disks. Fig. 7, is a like view of one of rotor-disks. Fig. 8, is a like view of one of the disk-separating washers.

In these drawings, A, indicates a worm-shaft, (see Fig. 1) having a worm A', thereon which intermeshes with the differential gear B, with which the axle-shaft B', is connected. This differential gear and driving-worm and the anti-friction bearing B', and thrust-bearing $B^2$, are of usual construction.

In embodying my invention with the form of gear shown in Fig. 1, I provide the worm-shaft A, with an extension $A^2$, upon which is placed a rotary member of a brake mechanism. I have shown in the drawings and described a multiple disk mechanism as a preferable form of brake mechanism, viz:— The extension $A^2$, I preferably make square in cross section, and upon this extension I place rotor-disks C, having square openings C', in the centers thereof (see Fig. 7). Upon the rear end of the housing $B^3$, of the bearings B' and $B^2$, I non-rotatably secure a hollow cylindrical member D, by means of bolts $d$. This cylindrical member D, is provided on its inner surface with ribs D', (see Fig. 4) and with an annular shoulder $D^2$, (see Fig. 1) and within the member D, I place stator-disks E, which are provided with notches $e$, (see Fig. 6) adapted to engage the ribs D', in the member D, which prevent the stator-disks from revolving in the member D. These stator-disks E, are provided with central openings E', of sufficient size to permit the extension $A^2$, on the worm-shaft A, to revolve freely therein. The stator-disks E, and the rotor-disks C, alternate with each other as shown in the drawings, and as is usual in multiple-disk friction clutches.

In order to have the disks C and E, spring apart when the brake mechanism is not operated, and thus eliminate any dragging effect, I place upon the extension $A^2$, between said disks, thin washers F, (see Fig. 8) as shown in Fig. 5, the thickness of said washers being such that when pressure is exerted upon the disks C and E, to force them into contact with each other, the metal of said disks will spring or dish, sufficiently to permit their peripheries to contact, while the central portions thereof engage the washers F, and when said pressure is released said disks will return to their normal flat condition.

For operating this brake mechanism, I provide a laterally movable disk G (see Figs. 1 and 5,) which is provided with a supporting hub G', which is provided with a recess $g$, adapted to receive the rear end of the extension $A^2$, of the worm-shaft A, thereinto. The hub G', is slidably mounted in the cover H, secured on the rear end of the cylindrical member D. For operating the disk G, I provide a lever $G^2$, which is pivoted in the hub G', by means of a pin $g'$, and upon the ears $h$, on the cover H, by means of a pin $h'$. I also preferably provide guide ears $h^2$, adapted to support the free end of the lever $G^2$, in which I place a spring $h^3$ (see Fig. 2) to return the lever to its normal position and move the disk away from the disks C and E. From the free end of the lever $G^2$, a rod $G^3$, leads to a foot lever (not shown) by means of which the lever $G^2$, may be operated to compress the disks C and E, as hereinbefore described.

In Fig. 3, I have shown my improved brake mechanism associated with a miter-gear and pinion driving mechanism of usual construction, in which the brake mechanism is placed upon the driving-shaft A, in front of the pinion J, and miter-gear K, of the differential. In this form the drive-shaft A, passes entirely through the hub G', of the disk G, and the short end of the lever $G^2$, is pivoted on the hub G', while the intermediate portion of the lever is pivoted upon the ear $h^4$; the anti-friction bearings in this form being of usual construction.

In operation, when the clutch mechanism of the vehicle (not shown) is operated to disconnect the motor and the momentum of the vehicle is operating the drive-shaft A, through the differential-gear, a large amount of power is necessarily lost by reason of the relation of the gear B or K, to the worm A' or J, and when the lever $G^2$, is operated to cause the friction surfaces of the brake mechanism associated with the drive-shaft A, to become engaged, a very small amount of power exerted upon said lever will accomplish the desired effect on the movement of the vehicle, as compared with the amount of power necessary to be exerted to render effective brake mechanism applied directly to the wheels of the vehicle.

Having shown and described the construction and operation of my invention so as to enable others to construct and use the same, what I claim as new and desire to secure by Letters Patent, is:—

1. In a motor vehicle, the combination of a propeller-shaft, an axle, intermeshing gears on said propeller-shaft and said axle, a housing for said gears, a thrust bearing to prevent longitudinal movement of said propeller-shaft, brake mechanism associated with said propeller-shaft within said housing, and manually operated means to control said brake-mechanism.

2. In a motor vehicle the combination of an axle, a gear thereon, a propeller shaft, a gear thereon intermeshing with the gear on said axle, a thrust-bearing to prevent longitudinal movement of said propeller shaft, a housing for said gears and thrust-bearing, brake-rotor mechanism on said propeller shaft, brake-stator mechanism supported within said housing and adapted to co-act with said rotor mechanism, and manually operated means to control said brake mechanism.

3. In a motor vehicle the combination of an axle, a propeller shaft, means to transmit power from said propeller shaft to said axle, a brake member on and rotated by said propeller shaft, a thrust-bearing to prevent longitudinal movement of said propeller shaft, a housing therefor, friction mechanism supported within said housing and adapted to co-act with the brake member on said propeller shaft, and manually operated lever mechanism to control said brake mechanism.

4. In a motor vehicle, a driven shaft, an axle, intermeshing gears on said shaft and axle, a series of rotating disks longitudinally movable on said shaft, a housing therefor, a thrust-bearing in said housing to prevent said driven shaft from moving longitudinally, a series of non-rotating disks alternating with said rotating disks supported in said housing and manually operated mechanism adapted to compress said disks.

In testimony whereof I affix my signature, in presence of two witnesses.

EDWIN DE H. CALDWELL.

Witnesses:
 CHESTER COOLEY,
 A. BRINKERHOFF.